United States Patent
Suthiwangcharoen et al.

(10) Patent No.: US 11,028,229 B2
(45) Date of Patent: Jun. 8, 2021

(54) METHOD FOR MAKING AN AMINO-FUNCTIONAL POLYDIORGANOSILOXANE USING A REMOVABLE ACID CATALYST

(71) Applicant: Dow Silicones Corporation, Midland, MI (US)

(72) Inventors: Nisaraporn Suthiwangcharoen, Midland, MI (US); Kimmai Nguyen, Midland, MI (US); Hannah Wedge, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/652,697

(22) PCT Filed: Apr. 3, 2019

(86) PCT No.: PCT/US2019/025494
§ 371 (c)(1),
(2) Date: Apr. 1, 2020

(87) PCT Pub. No.: WO2019/231557
PCT Pub. Date: Dec. 5, 2019

(65) Prior Publication Data
US 2021/0070944 A1    Mar. 11, 2021

Related U.S. Application Data

(60) Provisional application No. 62/678,425, filed on May 31, 2018.

(51) Int. Cl.
| | | |
|---|---|---|
| *C08G 77/08* | (2006.01) | |
| *C08G 77/16* | (2006.01) | |
| *C08G 77/388* | (2006.01) | |
| *C08K 5/544* | (2006.01) | |
| *C08G 77/26* | (2006.01) | |

(52) U.S. Cl.
CPC ............ *C08G 77/08* (2013.01); *C08G 77/16* (2013.01); *C08G 77/388* (2013.01); *C08K 5/544* (2013.01); *C08G 77/26* (2013.01)

(58) Field of Classification Search
CPC ....... C08G 77/08; C08G 77/26; C08G 77/338
USPC ........................................................... 528/38
See application file for complete search history.

(56) References Cited

U.S. PATENT DOCUMENTS

| | | | |
|---|---|---|---|
| 4,523,002 A | 6/1985 | Campbell et al. | |
| 4,539,379 A | 9/1985 | Hallgren | |
| 5,164,522 A | 11/1992 | McCarthy et al. | |
| 5,352,817 A | 10/1994 | McCarthy et al. | |
| 5,461,134 A | 10/1995 | Leir et al. | |
| 5,777,144 A | 7/1998 | Rubinsztajn et al. | |
| 5,824,814 A | 10/1998 | Cray et al. | |
| 7,238,768 B2 * | 7/2007 | Hupfield ................ | C08G 77/08 528/38 |
| 7,781,505 B2 | 8/2010 | Cook et al. | |
| 8,796,198 B2 * | 8/2014 | Henning ................ | C08G 77/26 510/466 |
| 9,273,072 B2 * | 3/2016 | Fritz-Langhals ..... | C07F 7/1804 |
| 10,336,866 B2 * | 7/2019 | Fritz-Langhals ...... | C08G 77/26 |
| 2013/0259821 A1 | 10/2013 | Henning et al. | |
| 2015/0112092 A1 * | 4/2015 | Fritz-Langhals ...... | C08G 77/26 556/413 |

FOREIGN PATENT DOCUMENTS

EP        1580215        9/2005

OTHER PUBLICATIONS

Search report from corresponding Japan 2020-518704 application, dated Sep. 8, 2020.

* cited by examiner

*Primary Examiner* — Margaret G Moore
(74) *Attorney, Agent, or Firm* — Catherine U. Brown

(57) ABSTRACT

A method for preparing an amino-functional polydiorganosiloxane employs a removable catalyst. The method differs from previous methods in the selection of catalyst, order of addition of catalyst with respect to other starting materials, and catalyst removal.

18 Claims, No Drawings

METHOD FOR MAKING AN AMINO-FUNCTIONAL POLYDIORGANOSILOXANE USING A REMOVABLE ACID CATALYST

CROSS REFERENCE TO RELATED APPLICATIONS

This application is a U.S. national stage filing under 35 U.S.C. § 371 of PCT Application No. PCT/US2019/025494 filed on Apr. 3, 2019, which claims the benefit of U.S. Provisional Patent Application No. 62/678,425 filed May 31, 2018 under 35 U.S.C. § 119 (e). PCT Application No. PCT/US2019/025494 and U.S. Provisional Patent Application No. 62/678,425 are hereby incorporated by reference.

TECHNICAL FIELD

This invention relates to a method for making an amino-functional polydiorganosiloxane via condensation reaction. More specifically, the method for making the amino-functional polydiorganosiloxane employs a removable catalyst.

INTRODUCTION

Amino-functional polydiorganosiloxanes are useful as conditioners in hair care applications or as softeners in textile applications. The amino groups can be either attached to terminal silicon atoms of a polydiorganosiloxane or as pendant groups attached to silicon atoms randomly distributed within the backbone of siloxane chains.

PROBLEM TO BE SOLVED

Carboxylic acid catalyzed condensation reaction has been used to produce amino-functional polydiorganosiloxanes. However, in known processes, the carboxylic acid or carboxylate salt thereof, or both, remains as a "living catalyst" in the polyorganosiloxane throughout its shelf-life, and this may have deleterious effects on stability.

SUMMARY

A method for preparing an amino-functional polydiorganosiloxane comprising:
1) mixing and heating, at a temperature of 50° C. to 150° C., starting materials comprising
   A) a silanol functional polydiorganosiloxane,
   B) an aminoalkyl-functional alkoxysilane,
where amounts of starting materials A) and B) are such that a molar excess of silanol groups with respect to alkoxy groups is present; and thereafter
2) adding starting material D) a carboxylic acid having a pKa value of 1 to 5 and a boiling temperature of 90° C. to 150° C. at 101 kPa and; thereby forming a reaction mixture;
3) mixing and heating the reaction mixture to form the reaction product and reduce amount of residual acid to 0 to <500 ppm, based on the weight of the amino-functional polydiorganosiloxane.

DETAILED DESCRIPTION

The method for preparing the amino-functional polydiorganosiloxane comprises mixing and heating starting materials under conditions to form a reaction product comprising the amino-functional polydiorganosiloxane. The starting materials comprise: A) a silanol functional polydiorganosiloxane, B) an aminoalkyl-functional alkoxysilane, and D) a carboxylic acid. The starting materials may optionally further comprise C) an endblocker having triorganosilyl groups which are unreactive with silanol functionality of starting material A). Starting material C), when present, is distinct from starting material B). The starting materials used in the method described above may be free of organic alcohols such as aliphatic alcohols having 8 to 30 carbon atoms, ether alcohols, and hydroxy-terminated polyethers. "Free of organic alcohols" means that the starting materials contain no organic alcohol or an amount of organic alcohol that is non-detectable by GC. Without wishing to be bound by theory, it is thought that presence of an organic alcohol may contribute to haziness (e.g., reduced transmittance as measured by the technique in the Reference Examples) of amino-functional polydiorganosiloxanes.

The inventors surprisingly found that amino-functional polydiorganosiloxanes made via previously disclosed processes contain sufficient acid content such that the amino-functional polydiorganosiloxanes have insufficient stability for some applications. Without wishing to be bound by theory, it is thought that the D) carboxylic acid used in the method described herein reacts with B) the aminoalkyl-functional alkoxysilane to form a carboxylate salt, which acts as a catalyst for reaction of the starting materials to form the amino-functional polydiorganosiloxane. However, even small amounts, i.e., on the order of 500 ppm, or more, of residual acid (in the form of carboxylic acid and/or the carboxylate salt) can detrimentally impact properties of the amino-functional polydiorganosiloxane. The inventors surprisingly found that removing D) the carboxylic acid and/or the carboxylate salt thereof such that residual acid content is <500 ppm, from the reaction product can improve stability of the amino-functional polydiorganosiloxane. Stability may be measured by viscosity, molecular weight, or degree of polymerization remaining stable (without significant change) over time, such as aging at 25° C. to 45° C. for 1 to 6 months. Without wishing to be bound by theory, it is thought that reducing residual acid content to <300 ppm, based on the weight of the amino-functional polydiorganosiloxane provides the additional benefit of a product that contains less than 0.1% cyclic polydiorganosiloxanes, such as D4 and/or D5, based on the weight of the amino-functional polydiorganosiloxane.

A) Silanol Functional Polydiorganosiloxane

Starting material A) is a silanol functional polydiorganosiloxane. Starting material A) comprises unit formula (I): $(R^1_3SiO_{1/2})_a(R^1_2SiO_{2/2})_b(HOR^1SiO_{2/2})_c(HOR^1_2SiO_{1/2})_d$, where each $R^1$ is independently selected from a monovalent hydrocarbon group and a monovalent halogenated hydrocarbon group, as defined below; and the subscripts have values such that: $2 \geq a \geq 0$, $4000 \geq b \geq 0$, $4000 \geq c \geq 0$, and $2 \geq d \geq 0$, with the provisos that a quantity $(a+d)=2$, a quantity $(c+d) \geq 2$, and a quantity $4 \leq (a+b+c+d) \leq 8000$. Alternatively, $4 \leq (a+b+c+d) \leq 4000$. Alternatively, $10 \leq (a+b+c+d) \leq 100$. Alternatively, $1000 \geq b \geq 0$. Alternatively, $1000 \geq c \geq 0$. Alternatively, subscripts a to d may have values sufficient to provide the silanol functional polydiorganosiloxane with a viscosity of 10 to 100 cP, alternatively 30 to 70 cP. Alternatively, each $R^1$ may be selected from alkyl and aryl. Alternatively, each $R^1$ may be selected from methyl and phenyl. Alternatively, at least 80% of all $R^1$ groups are methyl. Alternatively, each $R^1$ is methyl. Alternatively, starting material A) may comprise an α,ω-silanol endblocked polydiorganosiloxane of formula (II): $HOR^1_2SiO$—$(R^1_2SiO)_e$—$SiR^1_2OH$, where $R^1$ is as described above and subscript e has a value sufficient to provide the polydiorganosiloxane with a viscosity of 10 to 100 cP, alternatively 30 to 70 cP. Alternatively, subscript e has a value such that 4≤e≤1000. Alternatively, 10≤e≤100. Examples of suitable silanol functional polydiorganosiloxanes for starting material A) are exemplified by A1) a silanol end-blocked polydimethylsiloxane with a viscosity of 30 cP to 70 cP, A2) a silanol end-blocked polydimethylsiloxane with a degree of polymerization of 4 to 1000, or both A1) and A2). Silanol-terminated polydiorganosiloxanes suitable for use as starting material A) may be prepared by methods known in the art, such as hydrolysis and condensation of the corresponding organohalosilanes or equilibration of cyclic polydiorganosiloxanes.

The amount of starting material A) is sufficient that a molar ratio of silanol groups on starting material A) to Si-bonded alkoxy groups of starting material B) is greater than 1:1. Without wishing to be bound by theory, it is thought this will ensure that chain extension polymerization takes place, rather than merely capping of the silanol groups by the aminoalkyl-functional alkoxysilane B). Alternatively, the molar ratio of silanol groups of starting material A) to Si-bonded alkoxy groups of starting material B) may range from 1.2:1 to 2:1.

B) Aminoalkyl-Functional Alkoxysilane

Starting material B) contains an aminoalkyl group and an alkoxy group bonded to Si. The aminoalkyl group may have formula (III): R—(NH-A')$_q$—NH-A- wherein A and A' are each independently a linear or branched alkylene group having 1 to 6 carbon atoms and optionally containing an ether linkage; subscript q is 0 to 4; R is hydrogen, an alkyl group, or a hydroxyalkyl group having 1 to 4 carbon atoms. Alternatively, R may be hydrogen; q may be 0 or 1; and A and A' (if present) each contain 2 to 4 carbon atoms. Examples of suitable aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)$_3$NH$_2$, —(CH$_2$)$_3$NH(CH$_2$)$_4$NH$_2$, and —(CH$_2$)$_3$O(CH$_2$)$_2$NH$_2$. The alkoxy group bonded to Si can contain an unreactive substituent or linkage such as an ether linkage. The aminoalkyl-functional alkoxysilane may have formula (IV):

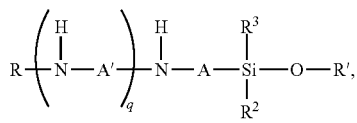

where A, A', R, and subscript q are as defined above; R' is an alkyl or alkoxyalkyl group having 1 to 6 carbon atoms, for example, methyl, ethyl, butyl or methoxyethyl; and R$^2$ and R$^3$ are each independently a group —OR' or an optionally substituted alkyl or aryl group. Alternatively, for the preparation of linear polydiorganosiloxanes, the group R$^2$ may be an alkyl group such as methyl and the group R$^3$ may have the formula —OR', such as methoxy or ethoxy. Examples of aminoalkyl-functional alkoxysilanes suitable for starting material B) include B1) 3-aminopropylmethyl dimethoxysilane, B2) 3-aminopropylmethyl diethoxysilane, B3) aminoethyl-aminoisobutyl methyl dimethoxy silane, B4) aminoethyl-aminoisobutyl methyl diethoxysilane, B5) 3-aminopropyldimethyl ethoxysilane, B6) 3-aminopropyldimethyl methoxysilane, B7) 3-(2-aminoethylamino)propyl-dimethoxymethylsilane, B8) 3-(2-aminoethylamino)propyl-diethoxymethylsilane, B9) aminopropyl methyl dimethoxy silane, B10) aminopropyl methyl diethoxysilane, and B11) a combination of two or more of B1) to B10). In one embodiment, the aminoalkyl-functional alkoxysilane comprises a monoalkoxysilane, such as B5) 3-aminopropyldimethyl ethoxysilane or B6) 3-aminopropyldimethyl methoxysilane, and the amino-functional polydiorganosiloxane has amino-functional end capping therefrom. Alternatively, the starting materials may comprise a separate endblocker.

C) Endblocker

Starting material C) is an endblocker that may optionally be added to the starting materials in the method described herein. The endblocker may be used to cap some of the silanol groups on starting material A), for example, when the amino-functional polydiorganosiloxane will have pendant amino-functional groups and/or when a trihydrocarbylsilyl-terminated (e.g., trialkyl-silyl terminated, such as trimethylsilyl-terminated) amino-functional polydiorganosiloxane will be produced by the method. The endblocker is capable of reacting with a silanol group and generating an endblocking triorganosilyl unit where the triorganosilyl functionality is unreactive with the silanol groups of starting material A). Suitable endblockers are exemplified by C1) a monoalkoxysilane, C2) a silazane, or C3) both C1) and C2).

The monoalkoxysilane may have formula (V): R$^4$$_3$SiOR$^5$, where each R$^4$ is independently a monovalent organic group unreactive with silanol functionality and each R$^5$ is independently a monovalent hydrocarbon group of 1 to 6 carbon atoms. Alternatively, R$^5$ may be an alkyl group of 1 to 6 carbon atoms, alternatively 1 to 4 carbon atoms, alternatively 1 to 2 carbon atoms, and alternatively R$^5$ may be methyl. Each R$^4$ may be a monovalent hydrocarbon group selected from alkyl, alkenyl, and aryl groups. Alternatively, each R$^4$ may be an alkyl group of 1 to 6 carbon atoms, an alkenyl group of 2 to 6 carbon atoms or a phenyl group. Alternatively, each R$^4$ may be an alkyl group of 1 to 6 carbon atoms, alternatively 1 to 4 carbon atoms, and alternatively each R$^4$ may be methyl. Examples of monoalkoxysilanes for starting material C1) include C4) trimethylmethoxysilane and C5) trimethylethoxysilane.

Suitable silazanes may have formula (VI): (R$^6$R$^7$$_2$Si)$_2$NH, where each R$^6$ is independently selected from the group consisting of a monovalent hydrocarbon group and a monovalent halogenated hydrocarbon group (as described herein for R$^1$), each R$^7$ is an independently selected monovalent hydrocarbon group of 1 to 6 carbon atoms, as described above for R$^5$. Each R$^6$ may independently be an alkyl group, an alkenyl group, or a halogenated alkyl group. Suitable alkyl groups for R$^6$ include methyl, ethyl, propyl, and butyl. Suitable alkenyl groups include vinyl and allyl. Suitable halogenated alkyl groups include trifluoropropyl. Examples of suitable silazanes for starting material C2) include C6) hexamethyldisilazane, C7) sym-tetramethyldivinyldisilazane, and C8) [(CF$_3$CH$_2$CH$_2$)(CH$_3$)$_2$Si]$_2$NH.

The endblocker is optional and may be added in an amount up to 5%, alternatively 0.1% to 5%, based on combined weights of all starting materials used in step 1) of the method. When present, all or a portion of starting material C) may be added in step 1). Alternatively, a first portion of starting material C) may be added in step 1) and a second portion of starting material C) may be added in an additional step added to the method before step 4). This additional step may be performed after step 2).

D) Carboxylic Acid

The carboxylic acid suitable as starting material D) has a boiling temperature of 90° C. to 150° C. and a pKa value of 1 to 5. The amount of carboxylic acid added in step 2) of the method described herein is 0.01% to 5%, based on combined weights of all starting materials used in the method. The carboxylic acid may be an aliphatic carboxylic acid. Suitable carboxylic acids include D1) ethanoic acid, D2) propionic acid, or D3) both D1) and D2). The carboxylic acid selected for starting material D) must be capable of being removed from the amino-functional polydiorganosiloxane, such that residual acid content is <500 ppm, alternatively <300 ppm, based on the weight of amino-functional polydiorganosiloxane under conditions (e.g., temperature and pressure) that do not significantly degrade the amino-functional polydiorganosiloxane. Without wishing to be bound by theory, it is thought that more residual acid contributes to poor stability and removing sufficient residual acid provides certain unexpected benefits. Without wishing to be bound by theory, it is thought that residual acid content <500 ppm will produce a more stable amino-functional polydiorganosiloxane than amino-functional polydiorganosiloxanes with >500 ppm residual acid, and residual acid content <300 ppm will produce an amino-functional polydiorganosiloxane having <0.1% cyclic polydiorganosiloxanes such as D4 (after aging for 6 months at 45° C. according to the test method in the reference examples, below). Without wishing to be bound by theory, it is thought that the use of aliphatic carboxylic acids of 2 or 3 carbon atoms will provide the benefit of being sufficiently removable under devolatilization conditions that do not degrade the amino-functional polydiorganosiloxane produced by the method. The inventors surprisingly found that use of an aliphatic carboxylic acid of 2 or 3 carbon atoms will provide a product without haziness (with good transmittance as measured according to the technique in the Reference Examples) even in the absence of co-solvents and organic alcohols. Furthermore, the inventors surprisingly found that use of aliphatic carboxylic acids of 2 or 3 carbon atoms, which are not substituted by an electron-withdrawing moiety, for example halogen such as fluorine or chlorine or a hydroxyl group, also yield amino-functional polydiorganosiloxanes that do not have an undesirable odor.

All, or a portion, of starting material D) may be added in step 2). Alternatively, a first portion of starting material D) may be added in step 2) and a second portion of starting material D) may be added in a later additional step. The later additional step is added before step 3). The later additional step may be after step 2) and before step 3). Without wishing to be bound by theory, the method described herein may provide the benefit of being solventless. Starting materials A), B), and D), and optionally C) can be combined neat, without emulsification in water or without the presence of a solvent.

Amino-Functional Polydiorganosiloxane

The amino-functional polydiorganosiloxane produced as described herein comprises unit formula (VII): $(R^1_3SiO_{1/2})_a(R^1_2SiO_{2/2})_b(R^8R^1SiO_{2/2})_c(R^8R^1_2SiO_{1/2})_d$, where $R^1$ and subscripts a, b, c, and d are as described above, and at least one $R^8$ per molecule is a group of formula (VIII):

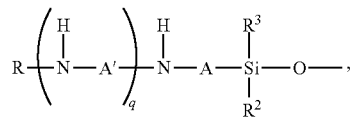

where R, $R^2$, $R^3$, A, A' and subscript q are as described above. Alternatively, 80% to 100% of all groups $R^8$ have formula (VIII). Without wishing to be bound by theory, when the endblocker C) is not used, all or substantially all of groups $R^8$ have formula (VIII). Alternatively, one or more of groups $R^8$ may have a formula derived from the endblocker, when it is used. For example, when a monoalkoxysilane of formula (V) is used as endblocker, some of groups $R^8$ may have formula $R^4_3SiO—$, where $R^4$ is as described above. And, when a silazane of formula (VI) is used as endblocker, some of $R^8$ may have formula $R^6R^7_2SiO—$, where $R^6$ and $R^7$ are as described above.

The amino-functional polydiorganosiloxane produced as described herein may have a transmittance of at least 95%, alternatively 99% to 100%, as measured by the technique described in the Reference Examples, below. The amino-functional polydiorganosiloxane produced as described herein may have a cyclic polydiorganosiloxane content of 0 to <0.1%. The amino-functional polydiorganosiloxane produced as described herein may be stable after aging for 1 to 6 months at RT, as shown in that viscosity of the amino-functional polydiorganosiloxane changes by 0 to 12% as measured by the technique in the Reference Examples below.

The method for preparing the amino-functional polydiorganosiloxane comprises:
1) mixing and heating, at a temperature of 50° C. to 150° C., starting materials comprising
   A) the silanol functional polydiorganosiloxane described above,
   B) the aminoalkyl-functional alkoxysilane described above,
where amounts of starting materials A) and B) are such that a molar excess of silanol groups with respect to alkoxy groups is present, and
   C) 0 to 0.5%, based on combined weights of all starting materials, of the endblocker described above; and thereafter
2) adding starting material D) 0.01% to 5%, based on weight of starting material B), of the carboxylic acid having a boiling temperature of 90° C. to 150° C. at a pressure of 101 kPa and pKa value of 1 to 5; thereby forming a reaction mixture;
3) mixing and heating the reaction mixture to form the reaction product and reduce amount of residual acid to 0 to <500 ppm, based on the weight of the amino-functional polydiorganosiloxane.

Mixing and heating may be performed using any convenient means, such as loading the starting materials into an agitated, jacketed batch reactor or reactive distillation apparatus having a jacketed vessel, which can be heated and cooled by passing steam/water or heat transfer fluid through the jacket. Step 1) may be performed at a temperature of at least 50° C., alternatively at least 85° C., and alternatively at least 90° C. Alternatively, heating in step 1) may be performed at 50° C. to 150° C., alternatively 85° C. to 150° C., and alternatively 90° C. to 150° C. Step 2) may be performed using any convenient means, such as metering equipment. Step 2) may be performed at the temperature described above for step 1). Step 3) may be performed by any convenient means such as heating the reaction product at a temperature of at least 90° C. at a pressure <100 mmHg for at least 1 hour, alternatively at least 2 hours. Alternatively, step 3) may be performed by heating the reaction product at a temperature of 100° C. to 150° C., alternatively 90° C. to 120° C., at a pressure of 0 to <100 mmHg for 1 to 10 hours, alternatively 2 to 8 hours, and alternatively 2 to 4 hours. The carboxylic acid selected as starting material D) is sufficiently volatile, and the conditions (temperature, pressure, time) for step 3) are selected such that residual acid is <500 ppm, alternatively <300 ppm after step 3).

Without wishing to be bound by theory, it is thought that the ammonium carboxylates (e.g., ammonium propionate and ammonium acetate) are sufficiently volatile enough at the conditions (e.g., boiling point of 117° C. for ammonium acetate and boiling point of 141° C. for ammonium propionate) described above to catalyze reaction and be removed to a sufficient degree. The salt exists in an equilibrium form, so it is thought that the salt can either be removed individually or in a salt form (if $NH_3$ is formed, e.g., $NH_3$ can be generated from a silazane endblocker such as HMDZ) and reform the salt in a waste trap or condenser.

The amino-functional polydiorganosiloxane produced as described herein can be used in organic solvent solution or in aqueous solution or suspension. Compositions containing the amino-functional polysiloxane can contain additional ingredients such as surfactants, thickeners, rheology modifying additives, perfumes, waxes, emollients, cleaning agents, lubricating oils, electrolytes, biocides, and cosmetic materials.

The amino-functional polydiorganosiloxane can be chemically modified by reaction after it has been formed. Such modifications are known, for example, in preparing textile treatment agents. It can, for example, be reacted with a lactone, particularly a lactone of an omega-hydroxy carboxylic acid having 3 to 8 ring carbon atoms such as epsilon-caprolactone or gamma-butyrolactone, under the conditions described in U.S. Pat. No. 5,824,814, to form a polymer having hydroxyamide groups of the formula —N—C(O)—$(CH_2)_x$—OH, where subscript x is 2 to 7. The amino-functional polydiorganosiloxane can be reacted with an epoxide to form a polymer containing beta-hydroxyamine groups, for example with ethylene oxide to form —NH—$CH_2CH_2OH$ groups as described in U.S. Pat. No. 5,352,817 or with glycidol to form —NH—CH$(CH_2OH)_2$ groups. Alternatively, the amino-functional polydiorganosiloxane can be reacted with an acrylate or other activated C=C bond in a Michael-type addition, for example with hydroxyethyl acrylate to form —NH—$CH_2$—$CH_2$—COO—$C_2H_4OH$ groups. The amino-functional polydiorganosiloxane can be quaternized by reaction with an alkylating agent such as dimethyl sulphate as described in U.S. Pat. No. 5,164,522.

EXAMPLES

Some embodiments of the invention will now be described in detail in the following Examples. The following starting materials are used in these examples: A1) silanol end-blocked PDMS with a viscosity of 70 cP, A2) silanol end-blocked PDMS with a viscosity of 30 cP, B2) 3-aminopropylmethyl diethoxysilane, B3) aminoethyl-aminoisobutyl methyl dimethoxy silane, B5) 3-aminopropyldimethyl ethoxysilane, C6) HMDZ, C4) trimethylmethoxysilane, D1) acetic acid, D2) propionic acid, D') octanoic acid (comparative, not removable), and D") lactic acid (comparative, not removable).

In this example 1, low viscosity 0.1% N amino-functional polydimethylsiloxane was synthesized as follows. To a reaction vessel, the following materials (with amounts shown in weight parts) were charged: A1) silanol end-blocked PDMS (244-270), B2) 3-aminopropylmethyl diethoxysilane (3.45-3.79), and C6) HMDZ (1). The resulting mixture was heated to 90° C. for 10 minutes under a $N_2$ sweep. After 10 min, D2) propionic acid (1.52-1.83) was added, and the resulting mixture was stirred at 90° C. for 2 hrs. The distillation vacuum was then applied at the pressure <20 mmHg for 140-210 min to drive the reaction forward as indicated by an increase in viscosity over time. The reaction was quenched with HMDZ (0.6-0.72) and allowed to stirred at 90 C for 2 hrs. The distillation vacuum was then applied at the pressure <20 mmHg for 2 hrs. Upon completion, the reaction vessel contents were cooled to RT and purged with $N_2$ before storing. The resulting clear and colorless fluid was an amino-functional polydimethylsiloxane with trimethyl end capping, which contained <200 ppm of propionic acid as detected by ion chromatography. This amino-functional polydimethylsiloxane had a viscosity of 1800-2500 cP, amine content of 0.1%, and a transmittance of 100%. This amino-functional polydimethylsiloxane was stable for 6 months after aging at 45° C. No ammonia odor was detected. This example shows that that a clear amino-functional polydimethylsiloxane with excellent transmittance (T=100%, no haziness) and good stability could be prepared using acetic acid.

In this example 2, high viscosity 0.1% N amino-functional polydimethylsiloxane amino-functional polydimethylsiloxane was synthesized as follows. To a reaction vessel, the following materials (in weight parts) were charged: A1) silanol end-blocked PDMS (927.1), B2) 3-aminopropylmethyl diethoxysilane (13.1), and C6) HMDZ (3.89). The resulting mixture was heated to 90° C. for 10 minutes under a $N_2$ sweep. After 10 min, D2) propionic acid (6.3) was added, and the resulting mixture was stirred at 90° C. for 2-3 hrs. The distillation vacuum was then applied at the pressure <20 mmHg for 300 min to drive the reaction forward as indicated by an increase in viscosity over time. Excess HMDZ and propionic acid were then removed by stripping at the temperature ranging from 100-150° C. depending upon the vacuum pressure and stripping time. Upon completion, the reaction vessel contents were cooled to RT and purged with $N_2$ before storing. The resulting clear and colorless fluid was an amino-functional polydimethylsiloxane with trimethyl end capping, which contained <300 ppm of propionic acid as detected by ion chromatography. This amino-functional polydimethylsiloxane had a viscosity of 3000-3500 cP, amine content of 0.1%, and a transmittance of 100%. This amino-functional polydimethylsiloxane was stable for 6 months after aging at 45° C. No ammonia odor was detected. This example shows that that a clear amino-functional polydimethylsiloxane with excellent transmittance (T=100%, no haziness) and good stability could be prepared using propionic acid.

In this example 3, 0.7% N amino-functional polydimethylsiloxane was synthesized as follows. To a reaction vessel, the following materials (in weight parts) were charged: A2) silanol end-blocked PDMS (663.1), B2) 3-aminopropylmethyl diethoxysilane (77.2), and C6) HMDZ (4.1). The resulting mixture was heated to 90° C. for 10 minutes under a $N_2$ sweep. After 10 min, D2) propionic acid (5.7) was added, and the resulting mixture was stirred at 90° C. for 2 hrs. The distillation vacuum was then applied at the pressure <20 mmHg at 100° C. for 5 hr and at 150° C. for 2-4 hrs. Upon completion, the reaction vessel contents were cooled to RT and purged with $N_2$ before storing. The resulting clear and colorless fluid was an amino-functional polydimethylsiloxane with trimethyl end capping, which contained <100 ppm of propionic acid as detected by ion chromatography. This amino-functional polydimethylsiloxane had a viscosity of 2000-3000 cP, an amine content of 0.7%, and a transmittance of 100%. This amino-functional polydimethylsiloxane was stable for 6 months after aging at 45° C. No ammonia odor was detected. This example shows that that a clear amino-functional polydimethylsiloxane with excellent transmittance (T=100%, no haziness) and good stability could be prepared using propionic acid.

In this example 4, 0.8% N diamino-functional polydimethylsiloxane was synthesized as follows. To a reaction vessel, the following materials (in weight parts) were charged: A2) silanol end-blocked PDMS (171.7), B3) aminoethyl-aminoisobutyl methyl dimethoxy silane (12.4), and C6) HMDZ (1.8). The solution mixture was heated to 90° C. for 10 minutes under a $N_2$ sweep. After 10 min, D1) acetic acid (1.2) was added, and the resulting mixture was stirred at 90° C. for 2 hrs. The distillation vacuum was then applied at the pressure <20 mmHg for 180-300 min. Excess HMDZ and acetic acid were then removed by stripping at a temperature ranging from 100-120° C. depending upon the vacuum pressure and stripping time. Upon completion, the reaction vessel contents were cooled to RT and purged with $N_2$ before storing. The resulting clear and slightly yellow fluid was a di-amino-functional polydimethylsiloxane with trimethyl end capping, which contained <200 ppm of propionic acid as detected by ion chromatography. This polymer had a viscosity of 1800-2700 cP, amine content of 0.8%, and a transmittance of 99%. The polymer was stable after aging at RT for 4 months.

In this example 5, 0.6% N diamino-functional polydimethylsiloxane was synthesized as follows. To a reaction vessel, the following materials (in weight parts) were charged: A2) silanol end-blocked PDMS (118.9), A1) silanol end-blocked PDMS (115.8), B3) aminoethyl-aminoisobutyl methyl dimethoxy silane (12.8), and C6) HMDZ (1). The resulting mixture was heated to 90° C. for 10 minutes under a $N_2$ sweep. After 10 min, D2) propionic acid (1.1) was added, and the resulting mixture was stirred at 90° C. for an hour. The distillation vacuum was then applied at the pressure <20 mmHg for 1-2 hrs. HMDZ (1.64 g) was added, and the heating was continued for another 1.5 hrs. Upon completion, the reaction vessel contents were cooled to RT and purged with $N_2$ before storing. The resulting clear and slightly yellow fluid was a di-amino-functional polydimethylsiloxane with trimethyl end capping, which contained <200 ppm of propionic acid as detected by ion chromatography. This di-amino-functional polydimethylsiloxane had a viscosity of 2000-3000 cP, and an amine content of 0.6%.

In this example 6, amino-functional polydimethylsiloxane using trimethylmethoxysilane endblocker was synthesized as follows. To a reaction vessel, the following materials (in weight parts) were charged: A1) silanol end-blocked PDMS (122.7), B2) 3-aminopropylmethyl diethoxysilane (1.6), and C4) trimethylmethoxysilane (1.0). The resulting mixture was heated to 90° C. for 10 minutes. After 10 min, D2) propionic acid (2.6) was added, and the resulting mixture was stirred at 90° C. for 2 hrs. The distillation vacuum was then applied at the pressure <20 mmHg at 90° C. for 3 hrs. A second dose of D2) propionic acid (1.1 g) was added and the stripping was continued at 90° C. for 1 hr and at 150° C. for 2 hrs. Upon completion, the reaction vessel contents were cooled to RT and purged with $N_2$ before storing. The resulting clear and colorless fluid was an amino-functional polydimethylsiloxane with trimethyl end capping, which contained <300 ppm of propionic acid as detected by ion chromatography. This amino-functional polydimethylsiloxane had a viscosity of 3000-4000 cP and a transmittance of 100%. This amino-functional polydimethylsiloxane was stable for 18 months at RT and 45° C. No ammonia odor was detected.

In this example 7, a low viscosity terminal amino-functional polydiorganosiloxane was synthesized as follows. To a reaction vessel, the following materials (in weight parts) were charged: A1) silanol end-blocked PDMS (148.7) and B5) 3-aminopropyldimethyl ethoxysilane (1.7). The resulting mixture was heated to 90° C. for 10 minutes under a $N_2$ sweep. After 10 min, D2) propionic acid (1.0) was added, and the resulting mixture was stirred at 90° C. for 2 hrs. The distillation vacuum was then applied at the pressure <20 mmHg at 90° C. for 4 hrs. A second dose of D2) propionic acid (0.3) was added to the reaction vessel, and the distillation vacuum was applied at 90° C. for 1 hr and at 150° C. for 1 hr. Upon completion, the reaction vessel contents were cooled to RT and purged with $N_2$ before storing. The resulting clear and colorless fluid was an amino-functional polydimethylsiloxane with trimethyl end capping, which contained <300 ppm of propionic acid. The polymer had a viscosity 1800-3000 cP and a transmittance of 99%. The polymer was stable for 1 year at both RT and 45° C.

In this example 8, a high viscosity terminal amino-functional polydiorganosiloxane was synthesized as follows. To a reaction vessel, the following materials (in weight parts) were charged: A1) silanol end-blocked PDMS (148.7) and B5) 3-aminopropyldimethyl ethoxysilane (1). The resulting mixture was heated to 90° C. for 10 minutes under a $N_2$ sweep. After 10 min, D2) propionic acid (1.0) was added, and the resulting mixture was stirred at 90° C. for 2 hrs. The distillation vacuum was then applied at the pressure <20 mmHg at 90° C. for 4 hrs. A second dose of D2) propionic acid (0.3) was added to the reaction vessel, and the distillation vacuum was applied at 90° C. for 1.5 hr and at 150° C. for 1 hr. Upon completion, the reaction vessel contents were cooled to RT and purged with $N_2$ before storing. The resulting clear and colorless fluid was an amino-functional polydimethylsiloxane with trimethyl end capping. This amino-functional polydimethylsiloxane had a viscosity 8000-12500 cP and a transmittance of 99%. This amino-functional polydimethylsiloxane was stable for 2 years at RT.

In this example 9 (comparative), A1) a silanol end-blocked polydimethylsiloxane with a viscosity of approximately 70 cP (98.3 g), B2) aminopropyl methyl diethoxy silane (3.2 g) and D') octanoic acid (0.53 g) were charged to a three necked flask fitted with a condenser and thermometer, upon which they were heated to 85° C. for two hours under nitrogen. The reaction mixture was then devolatilized at 100° C. under reduced pressure of <20 mmHg for 1 hours. The resulting clear fluid was an amino-functional polydimethylsiloxane end capped with methoxy and silanol end groups. The amino-functional polydimethylsiloxane had a viscosity of 6700 cP. After one week aging at RT, the viscosity increased to 10446 cP. This example 9 shows the amino-functional polydimethylsiloxane had poor stability, as shown by increasing viscosity with time, when prepared using the starting materials of U.S. Pat. No. 7,238,768 example 14, in which octanoic acid was not removable and when the order of addition of starting materials differed from the present method steps.

In this example 10 (comparative), the following starting materials (in weight parts) were charged into a reaction vessel: A1) a silanol end-blocked polydimethylsiloxane with a viscosity of approximately 70 cP (98.3 g), B2) aminopropyl methyl diethoxy silane (3.2 g) and D') octanoic acid (0.53 g) were charged to a three necked flask fitted with a condenser and thermometer, upon which they were heated to 85° C. for two hours under nitrogen. The reaction mixture was then devolatilized at 100° C. under reduced pressure of <150 mmHg for 3 hrs. The resulting clear fluid was an amino-functional polydimethylsiloxane end capped with methoxy and silanol end groups. This polymer had a viscosity of 10,000 cP. After one week aging at RT, the viscosity increased to 300,000 cP. This example 10 shows the amino-functional polydimethylsiloxane had poor stability, as shown by increasing viscosity with time when prepared using some of the starting materials of U.S. Pat. No.

7,238,768 example 18, in which octanoic acid was not removable, and when the order of addition of starting materials differed from the present method steps.

Without wishing to be bound by theory, it was thought that due to high boiling temperatures (low volatility) most of the octanoic acid or lactic acid remained in the polymers produced in comparative examples 9 and 10; and when using these non-volatile acids instead of a catalyst as described herein for starting material D), the reactions proceeded very rapidly because the acid continued to catalyze the condensation reaction, leading to a non-robust process.

In this example 11 (comparative), 0.1% N amino-functional polydimethylsiloxane was synthesized as follows. To a reaction vessel, the following starting materials (in weight parts) were charged: A1) silanol end-blocked PDMS (244.96) and B2) 3-aminopropylmethyl diethoxysilane (3.46). The resulting mixture was heated to 90° C. for 10 minutes under a $N_2$ sweep. After 10 min, D") lactic acid (1) was added, and the resulting mixture was stirred at 90° C. for 2 hrs. The distillation vacuum was then applied at the pressure <20 mmHg for 200 min. C6) HMDZ (1.64) was added to quench the reaction and the sample was stirred at 90° C. for 2 hrs. The distillation vacuum was then applied at the aforementioned condition for 2 hrs. Upon completion, the reaction vessel contents were cooled to RT and purged with $N_2$ before storing. The resulting hazy fluid was an amino-functional polydimethylsiloxane with trimethyl end capping. This amino-functional polydimethylsiloxane had a viscosity of 6334 cP, amine content of 0.1%. After 1 month aging at RT and 45° C., the viscosity decreased to 5255 and 4403 cP, respectively. This example 11 showed that the amino-functional polydimethylsiloxane had poor transmittance (as shown by haziness) and poor stability, as shown by viscosity change over time when lactic acid, which was not removable, was used as catalyst.

In this example 12 (comparative), 0.8% N amino-functional polydimethylsiloxane was synthesized as follows. To a reaction vessel, the following materials (in weight parts) were charged: A1) silanol end-blocked PDMS (132.44), B2) 3-aminopropylmethyl diethoxysilane (16.12), and C6) HMDZ (0.57). The resulting mixture was heated to 90° C. for 10 minutes under a $N_2$ sweep. After 10 min, D') octanoic acid (0.89) was added, and the resulting mixture was stirred at 90° C. for 2 hrs. The distillation vacuum was then applied at the pressure <20 mmHg for 120 min. The distillation vacuum was then applied at the aforementioned condition for 2 hrs. Then more D') octanoic acid (0.7) was added, and the distillation was continued for another hour at 90° C. and for 3 hr at 150° C. Upon completion, the reaction vessel contents were cooled to RT and purged with $N_2$ before storing. The resulting clear and colorless fluid was an amino-functional polydimethylsiloxane with trimethyl end capping. This amino-functional polydimethylsiloxane had a viscosity of 315000 cP, amine content of 0.8%. After 6 month aging at RT, the viscosity decreased to 4718 cP. This example 12 showed that the amino-functional polydimethylsiloxane had poor stability, as shown by viscosity change over time when lactic acid, which was not removable, was used as catalyst.

Without wishing to be bound by theory, it is thought that when an endblocker (such as hexamethyldisilazane) is used in a method for making an amino-functional polydiorganosiloxane with a non-removable catalyst, the resulting amino-functional polydiorganosiloxane will lack stability, as shown by viscosity decrease over time. It is further thought that the remaining acid hydrolyzes the siloxane chain with time. And, when an endblocker is not included in the method for making an amino-functional polydiorganosiloxane with a non-removable catalyst, the resulting amino-functional polydiorganosiloxane will lack stability, as shown by viscosity increase with time.

Viscosity of the sample was measured before and after aging at RT for 1 month. As shown in Table 1 below, a significant viscosity drift was observed, indicating that this sample had poor stability when the residual acid was not removed.

TABLE 1

| $T_o$ Viscosity (cP) | Aged Viscosity (cP) | $T_o$ Mn | Aged Mn |
|---|---|---|---|
| 4282 | 8013 | 31500 | 36500 |
| 3814 | 6874 | 29600 | 32400 |

In this example 13 (comparative), a silanol end-blocked PDMS with a viscosity of 60 cP (90), aminoethyl-aminoisobutyl methyl dimethoxy silane (5), D1) acetic acid (0.5), and a $C_{13}$-$C_{15}$ aliphatic alcohol (5.1) were charged into a reaction vessel and heated to 85° C. for 2 hrs under $N_2$. The reaction mixture was then devolatilized at 85° C. under reduced pressure (100 mbar) for 4 hrs. The resulting polymer was an amino-functional polydimethylsiloxane end capped with a mixture of $C_{13}$-$C_{15}$ alkoxy, methoxy and silanol end groups. This amino-functional polydimethylsiloxane had a viscosity of 1265 cP and was a hazy fluid. Transmittance of this amino-functional polydimethylsiloxane was <90%. Without wishing to be bound by theory, it is thought that the devolatilization conditions were not good enough to remove sufficient carboxylic acid catalyst, thereby resulting in a hazy product with poor transmittance of <90%.

REFERENCE EXAMPLES—TEST METHODS

Viscosity of amino-functional polydimethylsiloxanes prepared in the examples described above was measured at RT with a Brookfield DV-III Ultra (CPE-52 spindle)). Results were reported in cP.

Amine content of the amino-functional polydimethylsiloxanes prepared in the examples described above was measured at RT via amine titration.

Transmittance of the amino-functional polydimethylsiloxanes prepared in the examples described above was measured with reference to water using a Spectronic 21: Milton Roy.

Ammonia odor was tested using a Hydrion® paper strip. The test was performed after the samples were aged.

Mn was measured using a conventional Gel Permeation Chromatography (GPC), based on polystyrene standards analyzed in THF. The samples were analyzed in THF (30 mg of sample in 5 mL of solvent), capped with acetic anhydride, filtered with a 0.45 micrometer PTFE syringe filtered, and analyzed against polystyrene standards. The chromatographic apparatus was a of a Waters 2695 Separations Module equipped with a vacuum degasser, a Waters 2410 differential refractometer and two (300 mm×7.5 mm) Polymer Laboratories Mixed C columns (molecular weight separation range of 200 to 3,000,000) preceded by a guard column. The separation was performed using certified grade THF programmed to flow at 1.0 mL/min, injection volume was set at 100 microliters and columns and detector were heated to 35° C. Data collection was 25 min and processing was performed using Atlas/Cirrus software.

The acid content was measured using ion chromatography. Samples were prepared by treating 2 g of sample with 10 mL of toluene and then extracting this solution with 10 mL of deionized water. The extraction mixtures were shaken at room temperature for one hour, centrifuged and the bottom aqueous layer from each mixture was analyzed by ion chromatography. Anion analyses for propionate were performed on an ion chromatograph equipped with a 2 mm×250 mm AS15 column, a 25 microliter sample loop and a conductivity detector. Isocratic 40 mM KOH was the eluent. Flow=0.35 mL/min, oven=30° C., suppressor=ASRS 300 recycle mode, current=50 mA, DX-500.

INDUSTRIAL APPLICABILITY

The amino-functional polydiorganosiloxanes prepared by the method described herein are useful in hair care and textile treatment applications. Without wishing to be bound by theory it is thought that use of the method described herein will provide one or more benefits to the amino-functional polydiorganosiloxane, such as: i) reduced yellowing with time, ii) reduced amine odor with time, iii) reduced viscosity drift with time, iv) less generation of cyclic siloxanes (such as D4 and/or D5 with time and v) high transmittance (e.g., 95% to 100%, alternatively 99% to 100% as measured according to the Reference Examples above; as compared to amino-functional polydiorganosiloxanes produced by previous methods in which the order of addition of starting materials differs, and the residual acid content is not reduced to <500 ppm.

Definitions and Usage of Terms:

The abbreviations used in this application have the meanings set forth in Table X.

TABLE X

| Abbreviation | Definition |
|---|---|
| ° C. | degrees Celsius |
| cP | centipoise |
| D4 | octamethylcyclotetrasiloxane |
| D5 | decamethylcyclopentasiloxane |
| DP | degree of polymerization |
| g | grams |
| GC | gas chromatography |
| GPC | gel permeation chromatography |
| HMDZ | hexamethyldisilazane |
| hr | hours |
| kPa | kiloPascals |
| min | minutes |
| mL | milliliters |
| mm | millimeter |
| mM | millimolar |
| Mn | number average molecular weight |
| $N_2$ | nitrogen |
| PDMS | polydimethylsiloxane |
| PTFE | polytetrafluoroethylene |
| ppm | parts per million |
| RT | room temperature of 20° C. to 25° C. |
| THF | tetrahydrofuran |

All amounts, ratios, and percentages are by weight unless otherwise indicated by the context of the specification. The amounts of all starting materials in a composition, or used in a method, total 100% by weight. The SUMMARY and ABSTRACT are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 1 to 12 includes not only the range of 1 to 12 including endpoints, but also 1, 2, 3, 4, 6, 10, and 12 individually, as well as any other number subsumed in the range. Furthermore, disclosure of a range of, for example, 1 to 12 includes the subsets of, for example, 1 to 3, 2 to 6, 10 to 12, and 2 to 6, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup hydrogen, alkyl and aryl; the subgroup hydrogen and alkyl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and hexyl, heptyl, octyl, nonyl, and decyl, as well as branched saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Divalent hydrocarbon group" means a divalent group made up of hydrogen and carbon atoms. Divalent hydrocarbon group includes alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene, e.g., ortho-phenylene; and alkaralkylene groups such as:

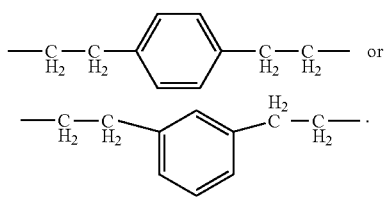

Alternatively, each divalent hydrocarbon group may be ethylene, propylene, butylene or hexylene. Alternatively, each divalent hydrocarbon group may be ethylene or propylene.

"Halogenated hydrocarbon group" means a hydrocarbon where one or more hydrogen atoms bonded to a carbon atom have been formally replaced with a halogen atom. Monovalent halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl.

"Monovalent hydrocarbon group" means a monovalent group made up of hydrogen and carbon atoms. Monovalent hydrocarbon groups include, alkyl, aralkyl, alkenyl, alkynyl, aryl, and carbocyclic groups such as cycloalkyl groups, as described above.

The term "comprise" or derivatives thereof such as "comprising" or "comprises" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to."

On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Embodiments of the Invention

In a first embodiment, a method for preparing an amino-functional polydiorganosiloxane comprises:
1) mixing and heating, at a temperature of 50° C. to 150° C., starting materials comprising
A) a silanol functional polydiorganosiloxane,
B) an aminoalkyl-functional alkoxysilane,
where amounts of starting materials A) and B) are such that a molar excess of silanol groups with respect to alkoxy groups is present, and
C) 0 to 0.5%, based on combined weights of all starting materials, of an endblocker having triorganosilyl groups; and thereafter
2) adding starting material D) 0.01% to 5%, based on weight of starting material B), of a carboxylic acid having a boiling temperature of 90° C. to 150° C. and pKa value of 1 to 5; thereby forming a reaction mixture;
3) mixing and heating the reaction mixture to form the reaction product and reduce amount of residual acid to 0 to <500 ppm, based on the weight of the amino-functional polydiorganosiloxane.

In a second embodiment, in the method of the first embodiment, in step 2) the amount of the residual acid is reduced to 0 to <300 ppm, based on the weight of the amino-functional polydiorganosiloxane.

In a third embodiment, in the method of the first embodiment, starting material A) is selected from the group consisting of:
A1) a silanol end-blocked polydimethylsiloxane with a viscosity of 30 cP to 70 cP, and
A2) a silanol end-blocked polydimethylsiloxane with a degree of polymerization of 4 to 8000.

In a fourth embodiment, in the method of the first embodiment, starting material B) is selected from the group consisting of:
B1) 3-aminopropylmethyl dimethoxysilane,
B2) 3-aminopropylmethyl diethoxysilane,
B3) aminoethyl-aminoisobutyl methyl dimethoxy silane,
B4) aminoethyl-aminoisobutyl methyl diethoxysilane
B5) 3-aminopropyldimethyl ethoxysilane, B6) 3-aminopropyldimethyl methoxysilane,
B7) 3-(2-aminoethylamino)propyl-dimethoxymethylsilane,
B8) 3-(2-aminoethylamino)propyl-diethoxymethylsilane,
B9) aminopropyl methyl dimethoxy silane,
B10) aminopropyl methyl diethoxysilane, and
B11) a combination of two or more of B1) to B10).

In a fifth embodiment, in the method of the first embodiment, starting material C) is present in an amount of at least 0.1% and starting material C) is selected from the group consisting of:
C1) hexamethyldisilazane,
C2) trimethylmethoxysilane,
C3) trimethylethoxysilane, and
C4) a combination of two or more of C1), C2) and C3).

In a sixth embodiment, in the method of the first embodiment, starting material D) is selected from the group consisting of:
D1) acetic acid,
D2) propionic acid, and
D3) both D1) and D2).

In a seventh embodiment, in the method of the first embodiments, condition i), condition ii) or both is present, where condition i) is all or a portion of starting material C) is added in step 1), ii) is all or a portion of starting material D) is added in step 2), or both i) and ii).

In an eighth embodiment, in the method of the seventh embodiment, condition i), condition ii) or both is satisfied, where condition i) is a portion of starting material C) is added in step 1), ii) a portion of starting material D) is added in step 2), or both i) and ii); and the method further comprises iii) adding a second portion of starting material C), iv) adding a second portion of starting material D), or both iii) and iv), in an additional step added to the method before step 4).

In a ninth embodiment, in the method of the seventh embodiment, all of starting material C) is added in step 1), and all of starting material D) is added in step 2).

In a tenth embodiment, in the method of the first embodiment, starting materials A) and B) are present in amounts such that a molar ratio of silanol groups to respect alkoxy groups is at least 1.1:1.

In an eleventh embodiment, in the method of the tenth embodiment, the molar ratio ranges from 1.2:1 to 2.0:1.

In a twelfth embodiment, in the method of the first embodiment, the catalyst is acetic acid or propionic acid, and step 3) is performed by heating the reaction product at a temperature of at least 90° C. at a pressure <100 mmHg for at least 2 hours.

In a thirteenth embodiment, in the method of the twelfth embodiment, step 3) is performed by heating the reaction product at a temperature of 100° C. to 150° C. at a pressure of 0 to <100 mmHg for 2 to 8 hours.

In a fourteenth embodiment, in the method of the first embodiment, starting material B) comprises an amino-functional monoalkoxysilane.

In a fifteenth embodiment, in the method of the fourteenth embodiment, the amino-functional polydiorganosiloxane is endcapped with an amino-functional group.

The invention claimed is:

1. A method for preparing an amino-functional polydiorganosiloxane comprising:
   1) mixing and heating, at a temperature of 50° C. to 150° C., starting materials comprising
      A) a silanol functional polydiorganosiloxane,
      B) an aminoalkyl-functional alkoxysilane,
      where amounts of starting materials A) and B) are such that a molar excess of silanol groups with respect to alkoxy groups is present, and
      C) 0.1% to 0.5%, based on combined weights of all starting materials, of an endblocker having triorganosilyl groups; and thereafter
   2) adding starting material D) 0.01% to 5%, based on weight of starting material B), of a carboxylic acid having a boiling temperature of 90° C. to 150° C. and pKa value of 1 to 5; thereby forming a reaction mixture;
   3) mixing and heating the reaction mixture to form the reaction product and reduce amount of residual acid in the form of the carboxylic acid and/or carboxylate salt to 0 to <500 ppm, based on the weight of the amino-functional polydiorganosiloxane.

2. The method of claim 1, where in step 2) the amount of the residual acid is reduced to 0 to <300 ppm, based on the weight of the amino-functional polydiorganosiloxane.

3. The method of claim 1, where starting material A) is selected from the group consisting of
   A1) a silanol end-blocked polydimethylsiloxane with a viscosity of 30 cP to 70 cP at room temperature, and
   A2) a silanol end-blocked polydimethylsiloxane with a degree of polymerization of 4 to 8000.

4. The method of claim 1, where starting material B) is selected from the group consisting of:
   B1) 3-aminopropylmethyl dimethoxysilane,
   B2) 3-aminopropylmethyl diethoxysilane,
   B3) aminoethyl-aminoisobutyl methyl dimethoxy silane,
   B4) aminoethyl-aminoisobutyl methyl diethoxysilane
   B5) 3-aminopropyldimethyl ethoxysilane,
   B6) 3-aminopropyldimethyl methoxysilane,
   B7) 3-(2-aminoethylamino)propyl-dimethoxymethylsilane,
   B8) 3-(2-aminoethylamino)propyl-diethoxymethylsilane,
   B9) aminopropyl methyl dimethoxy silane,
   B10) aminopropyl methyl diethoxysilane, and
   B11) a combination of two or more of B1) to B10).

5. The method of claim 1, where starting material C) is selected from the group consisting of:
   C1) hexamethyldisilazane,
   C2) trimethylmethoxysilane,
   C3) trimethylethoxysilane, and
   C4) a combination of two or more of C1), C2) and C3).

6. The method of claim 1, where starting material D) is selected from the group consisting of:
   D1) acetic acid,
   D2) propionic acid, and
   D3) both D1) and D2).

7. The method of claim 1, where: i) all or a portion of starting material C) is added in step 1), ii) all or a portion of starting material D) is added in step 2), or both i) and ii).

8. The method of claim 7, where: i) a portion of starting material C) is added in step 1), ii) a portion of starting material D) is added in step 2), or both i) and ii); and the method further comprises iii) adding a second portion of starting material C), iv) adding a second portion of starting material D), or both iii) and iv), in an additional step added to the method after step 2) and before step 3).

9. The method of claim 7, where all of starting material C) is added in step 1), and all of starting material D) is added in step 2).

10. The method of claim 1, where starting materials A) and B) are present in amounts such that a molar ratio of silanol groups to respect alkoxy groups is at least 1.1:1.

11. The method of claim 10, where the molar ratio ranges from 1.2:1 to 2.0:1.

12. The method of claim 1, where the catalyst is acetic acid or propionic acid, and step 3) is performed by heating the reaction product at a temperature of at least 90° C. at a pressure <100 mmHg for at least 2 hours.

13. The method of claim 12, where step 3) is performed by heating the reaction product at a temperature of 100° C. to 150° C. at a pressure of 0 to <100 mmHg for 2 to 8 hours.

14. The method of claim 1, where starting material B) comprises an amino-functional monoalkoxysilane.

15. The method of claim 1, where the amino-functional polydiorganosiloxane is endcapped with an amino-functional group.

16. The method of claim 1, the endblocker comprises C1) a monoalkoxysilane, C2) a silazane, or C3) both C1) and C2).

17. The method of claim 16, the monoalkoxysilane has formula (V): $R^4_3SiOR^5$, where each $R^4$ is independently a monovalent organic group unreactive with silanol functionality and each $R^5$ is independently a monovalent hydrocarbon group of 1 to 6 carbon atoms.

18. The method of claim 16, the silazane has formula (VI): $(R^6R^7_2Si)_2NH$, where each $R^6$ is independently selected from the group consisting of a monovalent hydrocarbon group and a monovalent halogenated hydrocarbon group, each $R^7$ is an independently selected monovalent hydrocarbon group of 1 to 6 carbon atoms.

* * * * *